(12) United States Patent
Huang et al.

(10) Patent No.: US 10,542,592 B2
(45) Date of Patent: Jan. 21, 2020

(54) LED DRIVER AND LED DRIVING METHOD

(71) Applicant: Silergy Semiconductor Technology (Hangzhou) LTD, Hangzhou, ZheJiang Province (CN)

(72) Inventors: Xiaodong Huang, Hangzhou (CN); Jin Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 3 days.

(21) Appl. No.: 15/678,382

(22) Filed: Aug. 16, 2017

(65) Prior Publication Data

US 2017/0367154 A1 Dec. 21, 2017

Related U.S. Application Data

(63) Continuation of application No. 14/809,430, filed on Jul. 27, 2015, now Pat. No. 9,788,369.

(30) Foreign Application Priority Data

Jul. 28, 2014 (CN) .......................... 2014 1 0364402

(51) Int. Cl.
*H05B 33/08* (2006.01)
*H02M 1/00* (2006.01)
*H02M 1/08* (2006.01)

(52) U.S. Cl.
CPC ........... *H05B 33/0812* (2013.01); *H02M 1/08* (2013.01); *H02M 2001/0003* (2013.01); *H05B 33/0815* (2013.01)

(58) Field of Classification Search
CPC .................. H02M 3/158; H02M 3/156; H02M 2001/0006; H02M 3/155; H02M 1/36;
(Continued)

(56) References Cited

U.S. PATENT DOCUMENTS 8,629,631 B1 * 1/2014 Rhodes .................. H02M 1/36
315/227 R
8,796,931 B2 8/2014 Savage, Jr.
(Continued)

FOREIGN PATENT DOCUMENTS

CN 201967222 U 9/2011

OTHER PUBLICATIONS

Frost, Phil FrostPhil. "Meaning of MOSFET 'Linear Region' in the Context of Switching Losses." Electrical Engineering Stack Exchange, Apr. 2014, electronics.stackexchange.com/questions/76071/meaning-of-mosfet-linear-region-in-the-context-of-switching-losses. (Year: 2014).*

(Continued)

*Primary Examiner* — Renan Luque
(74) *Attorney, Agent, or Firm* — Michael C. Stephens, Jr.

(57) ABSTRACT

A method of driving an LED can include: (i) controlling a main power switch by a control circuit of an LED driver; (ii) turning on an auxiliary power switch when the main power switch is turned on such that a DC bus voltage is provided to the main power switch through the auxiliary power switch, and the main power switch outputs a driving current to a load; (iii) charging a capacitor by the DC bus voltage through the auxiliary power switch when the main power switch is turned off, where the capacitor is charged until a voltage across the capacitor reaches a predetermined stable voltage; (iv) clamping the voltage across the capacitor at the predetermined stable voltage; and (v) using the clamping voltage across the capacitor as a supply voltage for the control circuit.

20 Claims, 9 Drawing Sheets

(58) Field of Classification Search
CPC . G06F 1/3243; G06F 1/3287; H05B 33/0839; H05B 33/0815; H05B 33/0887; H05B 33/0818; H03K 17/107; H03K 2217/0081; H03K 17/16
See application file for complete search history.

(56) References Cited

U.S. PATENT DOCUMENTS

| | | | |
|---|---|---|---|
| 8,810,147 B2 | 8/2014 | Hsieh | |
| 8,816,597 B2 | 8/2014 | Zuzuki | |
| 2001/0009494 A1* | 7/2001 | Umekawa | H03K 17/0822 361/93.9 |
| 2009/0179685 A1* | 7/2009 | Yanagigawa | H03K 17/0822 327/387 |
| 2012/0236456 A1* | 9/2012 | Yu | H03K 17/0822 361/91.1 |
| 2013/0155561 A1 | 6/2013 | Lai | |
| 2013/0187566 A1* | 7/2013 | Hsu | H05B 33/0818 315/294 |
| 2013/0234621 A1 | 9/2013 | Athalye | |
| 2013/0328492 A1 | 12/2013 | Hsieh | |
| 2014/0327372 A1* | 11/2014 | Zhang | H05B 33/0815 315/224 |
| 2015/0028764 A1* | 1/2015 | Maru | H03K 4/48 315/210 |
| 2015/0145562 A1* | 5/2015 | Vermeir | H05K 13/00 327/87 |
| 2016/0018876 A1* | 1/2016 | Strijker | H02M 3/155 713/323 |

OTHER PUBLICATIONS

Texas Instruments. "Fundamentals of MOSFET and IGBT Gate Driver Circuits" (Year: 2002).*

* cited by examiner

LED DRIVER AND LED DRIVING METHOD

RELATED APPLICATIONS

This application is a continuation of the following application, U.S. patent application Ser. No. 14/809,430, filed on Jul. 27, 2015, and which is hereby incorporated by reference as if it is set forth in full in this specification, and which also claims the benefit of Chinese Patent Application No. 201410364402.X, filed on Jul. 28, 2014, which is incorporated herein by reference in its entirety.

FIELD OF THE INVENTION

The present disclosure relates to the field of power electronics, and more particularly to an LED driver and associated driving method.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

SUMMARY

In one embodiment, a method of driving an LED can include: (i) controlling a main power switch by a control circuit of an LED driver; (ii) turning on an auxiliary power switch when the main power switch is turned on such that a DC bus voltage is provided to the main power switch through the auxiliary power switch, and the main power switch outputs a driving current to a load; (iii) charging a capacitor by the DC bus voltage through the auxiliary power switch when the main power switch is turned off, where the capacitor is charged until a voltage across the capacitor reaches a predetermined stable voltage; (iv) clamping the voltage across the capacitor at the predetermined stable voltage; and (v) using the clamping voltage across the capacitor as a supply voltage for the control circuit, where the capacitor is coupled between an input terminal of the supply voltage and a control ground.

In one embodiment, an LED driver can include: (i) a main power switch and a control circuit, where an output terminal of the control circuit is coupled to a gate of the main power switch for controlling switching states of the main power switch, and where the main power switch is coupled to a load; (ii) an auxiliary power switch coupled to a DC bus voltage and the main power switch; (iii) a capacitor coupled between a supply voltage of the control circuit and a control ground, where a voltage across the capacitor is configured as the supply voltage; (iv) a voltage-stabilizing circuit coupled to the supply voltage, and being configured to clamp the supply voltage to a predetermined stable voltage when the supply voltage reaches a level of the predetermined stable voltage; and (v) a supply voltage control circuit coupled between the auxiliary power switch and the supply voltage, where the DC bus voltage is configured to charge the capacitor through the auxiliary power switch and the supply voltage control circuit when the main power switch is off, and where the DC bus voltage is provided to the main power switch through the auxiliary power switch, and a driving current output from the main power switch is configured to drive the load when the main power switch and the auxiliary power switch are on.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Light-emitting diode (LED) lights can employ improved driving techniques, and may be widely used in various fields. An LED driver can be used to drive an LED load with a substantially constant current. An LED driver can include a power stage circuit and a control circuit. The control circuit may be used to intermittently turn on a main power switch in the power stage circuit, so as to convert an input voltage of the power stage circuit into a constant current for an LED load (e.g., a light). Various demands on LED drivers include smaller volume, lower production costs, and longer life time.

Figure 1:
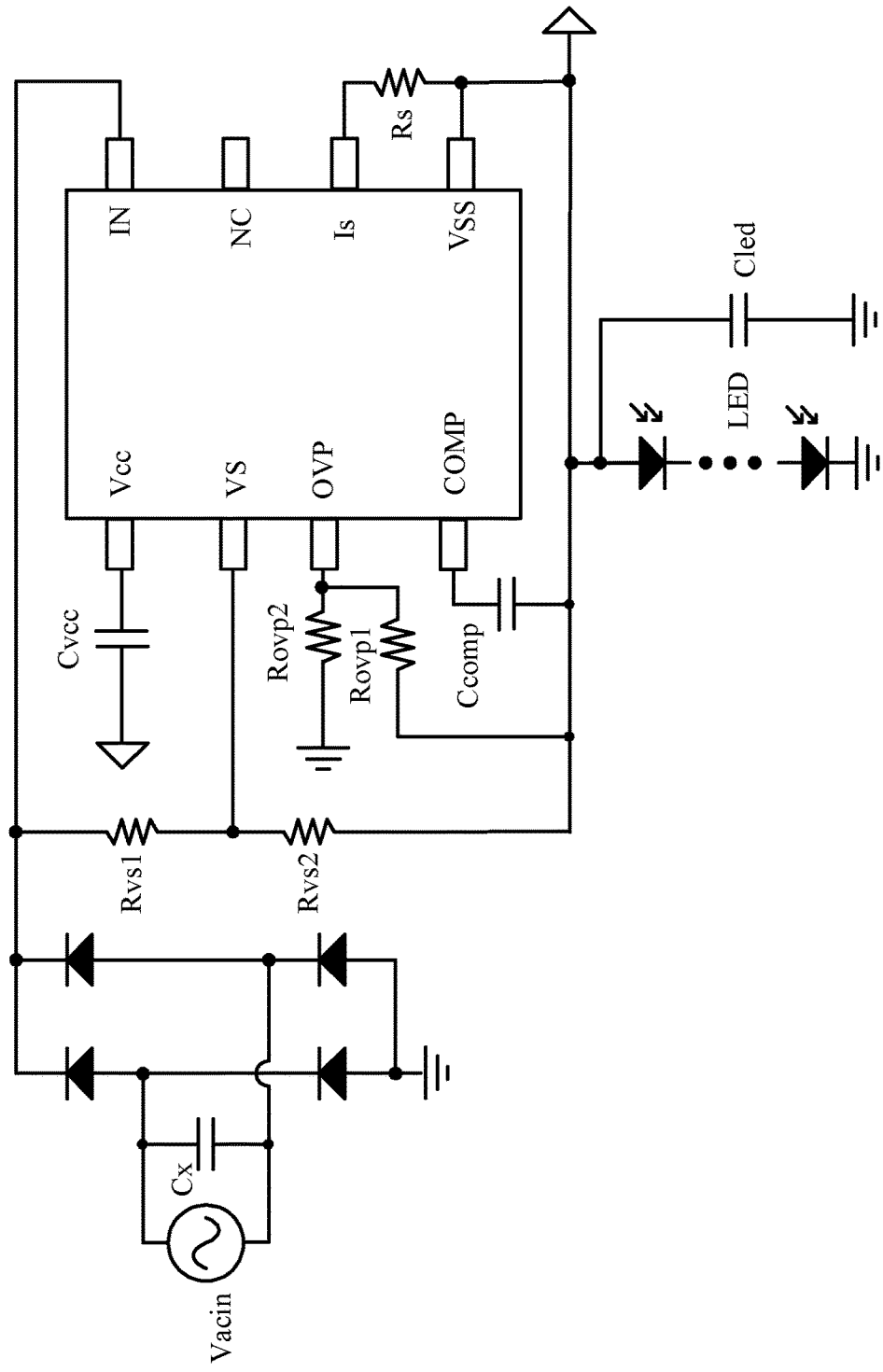
FIG. 1 is a schematic block diagram of a first example LED driver, in accordance with embodiments of the present invention.

Referring now to FIG. 1, shown is a schematic block diagram of a first example LED driver, in accordance with embodiments of the present invention. In this particular example, the main power stage circuit may be simplified to a high voltage depletion mode power transistor, such that the control circuit and the power transistor can be integrated into a high power density chip (e.g., a control chip). Therefore, the circuit volume may be largely reduced via an integrated circuit in this approach. However, an additional power supply circuit may be needed for this particular example in order to supply an operating voltage to the control circuit. In addition, a turning-on control signal for the main power switch may be obtained by sampling DC bus voltage Vin through voltage division resistors Rvs1 and Rvs2. While this approach is relatively simple, product costs and circuit volume may be increased due to the use of high voltage resistors.

In one embodiment, a method of driving an LED can include: (i) controlling a main power switch by a control circuit of an LED driver; (ii) turning on an auxiliary power switch when the main power switch is turned on such that a DC bus voltage is provided to the main power switch through the auxiliary power switch, and the main power switch outputs a driving current to a load; (iii) charging a capacitor by the DC bus voltage through the auxiliary power switch when the main power switch is turned off, where the capacitor is charged until a voltage across the capacitor reaches a predetermined stable voltage; (iv) clamping the voltage across the capacitor at the predetermined stable voltage; and (v) using the clamping voltage across the capacitor as a supply voltage for the control circuit, where the capacitor is coupled between an input terminal of the supply voltage and a control ground.

Figure 2:
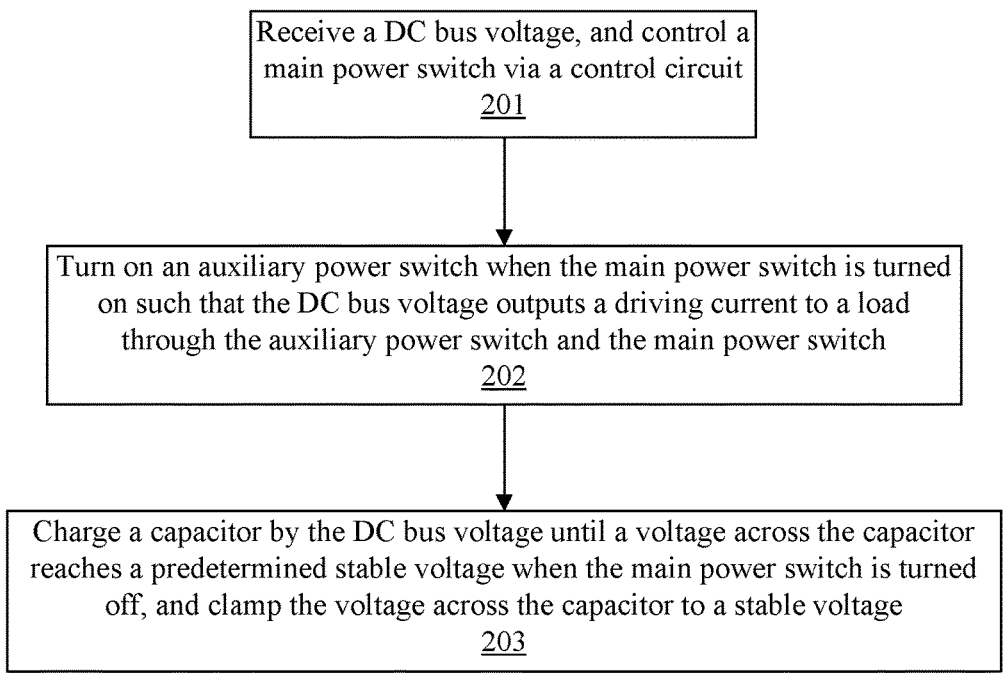
FIG. 2 is a flow diagram of an example method of driving an LED, in accordance with embodiments of the present invention.

Referring now to FIG. 2, shown is a flow diagram of an example method of driving an LED, in accordance with embodiments of the present invention. At 201, a DC bus voltage can be received. Also, a main power switch can be controlled via a control circuit. For example, the DC bus voltage can be obtained by rectifying an AC input power supply through a rectifier bridge. At 202, and auxiliary power switch can be turned on when the main power switch is turned on. In this case, the DC bus voltage can output a driving current to a load (e.g., an LED load) through the auxiliary power switch and the main power switch. At 203, a capacitor can be charged by the DC bus voltage until a voltage across the capacitor reaches a predetermined stable voltage when the main power switch is turned off. Also, the voltage across the capacitor can be clamped to a stable voltage (e.g., a predetermined voltage level).

The control circuit may generate a control signal for the main power switch, in order to control on/off states of the main power switch during normal operation of an LED driver. When the control signal is active, the main power switch can be turned on. When the auxiliary power switch is turned on, the power stage circuit of the LED driver can be formed by the auxiliary power switch and the main power switch coupled in series between an input terminal of the DC bus voltage and the load. In this case, the DC bus voltage can output the driving current to the load through the power stage circuit formed by the auxiliary power switch and the main power switch. Of course, the driving current may be utilized to drive LEDs when LEDs are employed as the load.

When the control signal is inactive, the main power switch can be turned off. In a predetermined time interval after the main power switch is turned off, the auxiliary power switch can remain on. In this case, the DC bus voltage may charge a capacitor that is coupled between a supply voltage input terminal and a control ground of the control circuit of the LED driver through the auxiliary power switch.

During the charging process, the voltage across the capacitor can increase (e.g., the supply voltage rises). Because of the voltage-stabilizing circuit that is coupled to the capacitor, the supply voltage can be clamped at a stable voltage such that the voltage across the capacitor can be used as the supply voltage of the control circuit during operation of the LED driver. Therefore, in particular embodiments, the LED driver can be self-powered, without any other power supply circuitry.

In one example, a starting resistor can be configured between the input terminal of the DC bus voltage and the capacitor. The DC bus voltage can charge the capacitor through the starting resistor in order to provide the supply voltage during a start-up (e.g., initialization or power up) phase of the LED driver. For example, during charging of the capacitor, the charging current for the capacitor can be limited to ensure that the charging current is less than an upper limit of a predetermined charging current. In this way, the capacitor may be protected by avoiding a potentially too high or damaging charging current.

In another example, during the charging process of the capacitor, when the charging current is greater than the upper limit of the predetermined charging current, over-current protection can be accommodated. In this case, the charging current may be disconnected by turning off the auxiliary power switch in order to effectively cut off the connection between the auxiliary power switch and the capacitor. In this way, the charging process of the capacitor can be disabled to protect the capacitor by avoiding charging current that is too high.

Also for example, operation of the LED driver, the DC bus voltage input to the LED driver can be monitored. If the DC bus voltage is greater than an upper limit of the input voltage (e.g., if an over voltage condition occurs), the auxiliary power switch and/or the main power switch can be turned off to protect the LED driver and the load. Whether the DC bus voltage is in an over voltage condition can be determined based on the gate voltage of the auxiliary power switch. The gate voltage can represent energy transferred to the auxiliary power switch by the parasitic capacitor thereof. When the gate voltage is greater than a predetermined voltage, an over voltage can be determined, and over voltage protection can begin by controlling a turn off the auxiliary power switch and/or the main power switch. In another example, the over voltage condition can be determined by monitoring a "jump slope" or transition time of a drain-source voltage of the main power switch. When such a jump slope is greater than a predetermined jump slope, over voltage protection can begin.

The control circuit of this particular example can control the turn on and off the main power switch according to the voltage input to the main power switch, and the saturated current flowing through the main power switch. For example, when the voltage input to the main power switch is less than a predetermined voltage, the control signal can be activated to turn on the main power switch. When the current flowing through the main power switch is saturated, the control signal can be deactivated to turn off the main power switch. In this way, the control circuit can control the driving current for the LED load by turning on/off the main power switch.

In particular embodiments, when the main power switch and the auxiliary power switch are turned on, the series-connected main power switch and auxiliary power switch may form the power stage circuit. In this case, the DC bus voltage can output the driving current for the LED load through the power stage circuit. Further, transistors can be used to implement the auxiliary power switch and the main power switch. Moreover, when the main power switch is turned off, the DC bus voltage can charge a capacitor through the auxiliary power switch, and the voltage across the capacitor may be used as the supply voltage of the control circuit. When the voltage across the capacitor reaches a predetermined stable voltage, the voltage across the capacitor can be clamped at the stable voltage. Thus, the LED driver can be self-powered without any other power supply circuitry in order to simplify the LED driver circuit structure.

In one embodiment, an LED driver can include: (i) a main power switch and a control circuit, where an output terminal of the control circuit is coupled to a gate of the main power switch for controlling switching states of the main power switch, and where the main power switch is coupled to a load; (ii) an auxiliary power switch coupled to a DC bus voltage and the main power switch; (iii) a capacitor coupled between a supply voltage of the control circuit and a control ground, where a voltage across the capacitor is configured as the supply voltage; (iv) a voltage-stabilizing circuit coupled to the supply voltage, and being configured to clamp the supply voltage to a predetermined stable voltage when the supply voltage reaches a level of the predetermined stable voltage; and (v) a supply voltage control circuit coupled between the auxiliary power switch and the supply voltage, where the DC bus voltage is configured to charge the capacitor through the auxiliary power switch and the supply voltage control circuit when the main power switch is off, and where the DC bus voltage is provided to the main power switch through the auxiliary power switch, and a driving current output from the main power switch is configured to drive the load when the main power switch and the auxiliary power switch are on.

Figure 3:
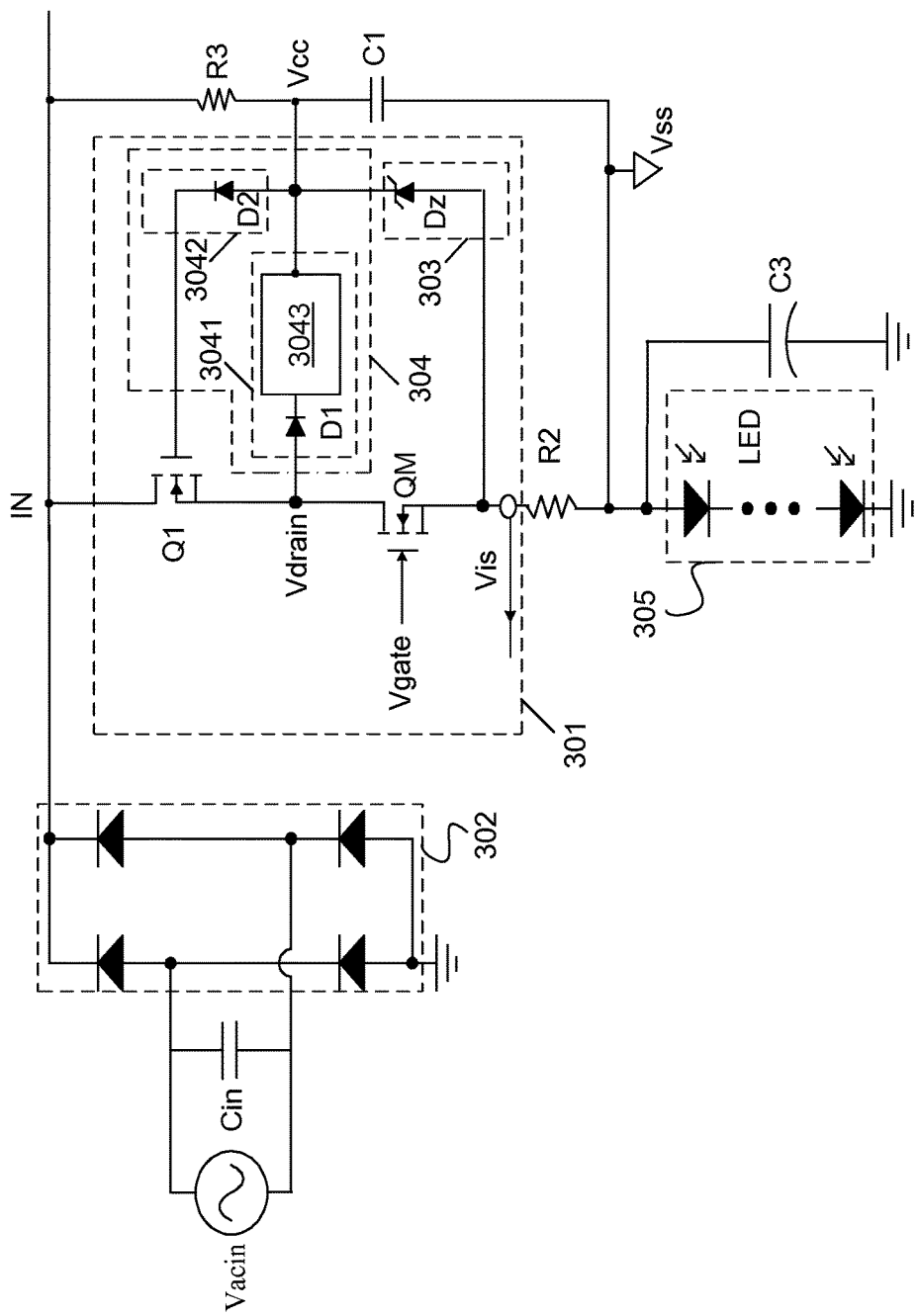
FIG. 3 is a schematic block diagram of a second example LED driver, in accordance with embodiments of the present invention.

Referring now to FIG. 3, shown is a schematic block diagram of a second example LED driver, in accordance with embodiments of the present invention. This particular example LED driving circuit can include main power switch QM, auxiliary power switch Q1, capacitor C1, voltage-stabilizing circuit 303, supply voltage control circuit 304, and a control circuit (not shown in FIG. 3). A drain electrode of auxiliary power switch Q1 can connect to input terminal IN of DC bus voltage Vin, and a source electrode of auxiliary power switch Q1 can connect to a drain electrode of main power switch QM. That is, auxiliary power switch Q1 can connect in series between the input terminal (IN) of DC bus voltage Vin, and main power switch QM. The source electrode of main power switch QM can be coupled to load 305, and may provide driving current Io to load 305.

Capacitor C1 can connect between supply voltage Vcc of the control circuit and control ground Vss, and the voltage across capacitor C1 can be configured as supply voltage Vcc of the control circuit. Voltage stabilizing circuit 303 can be coupled to the input terminal of supply voltage Vcc, and supply voltage control circuit 304 may be coupled between auxiliary power switch Q1 and the input terminal of supply voltage Vcc. The output terminal of the control circuit can be coupled to the control terminal of main power switch QM. During normal LED driver operation, the control circuit can control the main power switch to be turned on/off with a predetermined control principle. When main power switch QM and auxiliary power switch Q1 are both on, DC bus voltage Vin can provide driving current Io through a power stage circuit that includes auxiliary power switch Q1 and main power switch QM, in order to drive load 305.

During a predetermined time interval after main power switch QM is turned off, auxiliary power switch Q1 can remain on, and supply voltage control circuit 304 may be enabled. In this case, DC bus voltage Vin can charge capacitor C1 through auxiliary power switch Q1 and supply voltage control circuit 304. During the charging process, supply voltage Vcc may increase. When supply voltage Vcc rises to a level of the predetermined stable voltage of voltage-stabilizing circuit 303, the voltage of supply voltage Vcc (e.g., the voltage across the capacitor C1) can be clamped to a level of the stable voltage.

In this fashion, when main power switch QM and auxiliary power switch Q1 are turned on, the series-connected main power switch and auxiliary power switch may form the power stage circuit. In this case, DC bus voltage Vin can output driving current Io for the LED load through the power stage circuit. Also, transistors can be used to implement the auxiliary power switch Q1 and the main power switch QM, rather than using a high voltage depletion mode device. When main power switch QM is turned off, DC bus voltage Vin can charge capacitor C1 coupled between the input terminal of supply voltage Vcc and the control ground through auxiliary power switch Q1 and supply voltage control circuit 304. The voltage across capacitor C1 can be configured as supply voltage Vcc of the control circuit. When the voltage across capacitor C1 reaches a level of the predetermined stable voltage, voltage-stabilizing circuit 303 coupled to the input terminal of supply voltage Vcc can be utilized to clamp the voltage of capacitor C1 at the stable voltage. In this way, the LED driver of particular embodiments can be self-powered without further external supply voltage circuitry.

In certain embodiments, configuration of the LED driver can be simplified in order to reduce circuit volume and product costs, and to facilitate integrated circuit design. In the example of FIG. 3, rectifier bridge 302 can be utilized to rectify AC voltage Vacin, and to obtain DC bus voltage Vin. Also, zener diode Dz may be utilized as voltage-stabilizing circuit 303, with an anode connected to a common terminal of main power switch QM and load 305, and a cathode connected to the input terminal of supply voltage Vcc.

In the example of FIG. 3, unidirectional conduction circuits 3041 and 3042 may be used to form supply voltage control circuit 304. Unidirectional conduction circuits 3041 and can include diodes D1 and D2 as shown. The anode of diode D1 can connect to the source of auxiliary power switch Q1. The anode of diode D2 can connect to supply voltage Vcc, and the cathode of diode D2 can connect to the gate of auxiliary power switch Q1. When main power switch QM is turned on, drain voltage Vdrain of main power switch QM can be clamped to the zero potential of control ground Vss. Thus, the source voltage of auxiliary power switch Q1 that is coupled to the drain of main power switch QM can also be clamped to the zero potential.

In this case, unidirectional conduction circuit 3041 (e.g., including diode D1) may be off, and unidirectional conduction circuit 3042 (e.g., including diode D2) can be turned on due to the function of supply voltage Vcc. The gate voltage of auxiliary power switch Q1 may be clamped at supply voltage Vcc, and gate-source voltage Vgs of auxiliary power switch Q1 can be supply voltage Vcc. Thus, auxiliary power switch Q1 may be turned on and may form a power stage circuit with main power switch QM. DC bus voltage Vin can provide stable driving current Io for load 305 through such a power stage circuit.

During the time interval when main power switch QM is turned off, drain voltage Vdrain of main power switch may gradually rise. When drain voltage Vdrain rises to be slightly greater than supply voltage Vcc, unidirectional conduction circuit 3041 can be turned on, and capacitor C1 can begin to charge. In this case, supply voltage Vcc may gradually rise, and because of voltage-stabilizing circuit 303 (e.g., including zener diode Dz), capacitor C1 may stop charging when supply voltage Vcc rises to a level of the predetermined stable voltage (e.g., Uz).

In the example of FIG. 3, current limiter 3043 can also be included in unidirectional conduction circuit 3041. Current limiter 3043 can connect in series to diode D1, and during charging of capacitor C1, current limiter 3043 may limit the charging current to not go higher than an upper limit of the predetermined charging current, for circuit protection. For example, when the charging current of capacitor C1 is greater than the upper limit of the predetermined charging current, current limiter 3043 and unidirectional conduction circuit 3041 can be turned off such that charging of capacitor C1 is stopped/disabled.

Figure 4:
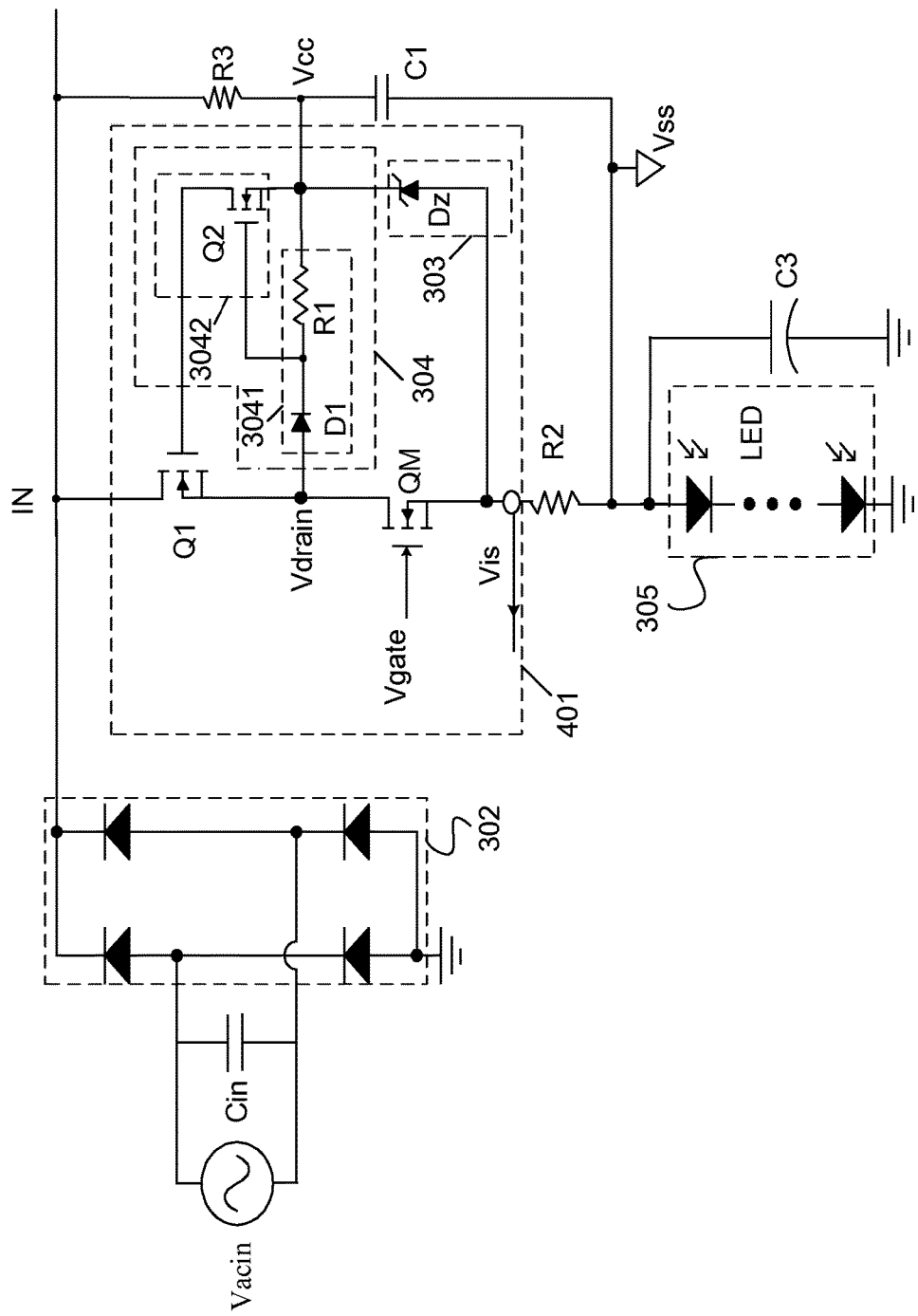
FIG. 4 is a schematic block diagram of a third example LED driver, in accordance with embodiments of the present invention.

Referring now to FIG. 4, shown is a schematic block diagram of a third example LED driver, in accordance with embodiments of the present invention. In this particular example resistor R1 can connect in series with diode D1 in unidirectional conduction circuit 3041. When switch Q2 (e.g., a transistor) is configured as unidirectional conduction circuit 3042, the drain of switch Q2 can connect to the gate of auxiliary power switch Q1, and the source and gate of switch Q2 can connect to the two terminals of resistor R1. Thus, the gate-source voltage of switch Q2 can equal the voltage across resistor R1. During the charging of capacitor C1, the charging current may flow through resistor R1, and the voltage across resistor R1 is larger as the charging current increases. When the charging current reaches the upper limit, the voltage across resistor R1 may be increased to reach the driving voltage of switch Q2. Thus, switch Q2 may be turned on, and the voltage across resistor R1 can be provided between the gate and source of auxiliary power switch Q1 to turn off power switch Q1. This can stop charging capacitor C1, in order to avoid a charging current that is too high from flowing to capacitor C1, so as to achieve current limiting protection.

When main power switch QM is turned on, the source voltage of auxiliary power switch Q1 may be pulled down to the zero potential of the control ground. In this case, unidirectional conduction circuit 3041 may be off, switch Q2 may be on, and the gate-source voltage of auxiliary power switch Q1 can equal to supply voltage Vcc. Thus, auxiliary power switch Q1 can be turned on, and DC bus voltage Vin may output driving current Io through auxiliary power switch Q1 and main power switch QM.

When the system quickly switches between on and off states, because capacitor C1 is coupled to the input terminal of supply voltage Vcc, the energy stored in capacitor C1 can maintain the LED driver as a normal operation for a time interval when the input voltage is off-line. During this time period or interval, if main power switch QM is on, relatively large current may flow through main power switch QM when the input voltage is a relatively high voltage, and this can potentially harm the LED driver and/or load 305. In order to address such a case, the LED driver may further include an over power protection monitor that can be used to turn off auxiliary power switch Q1 and/or main power switch QM when the current DC bus voltage Vin is greater than the upper limit of the predetermined input voltage (e.g., an over voltage condition). In this way, the input of DC bus voltage Vin can be cut off so as to protect the LED driver and load 305.

Figure 5:
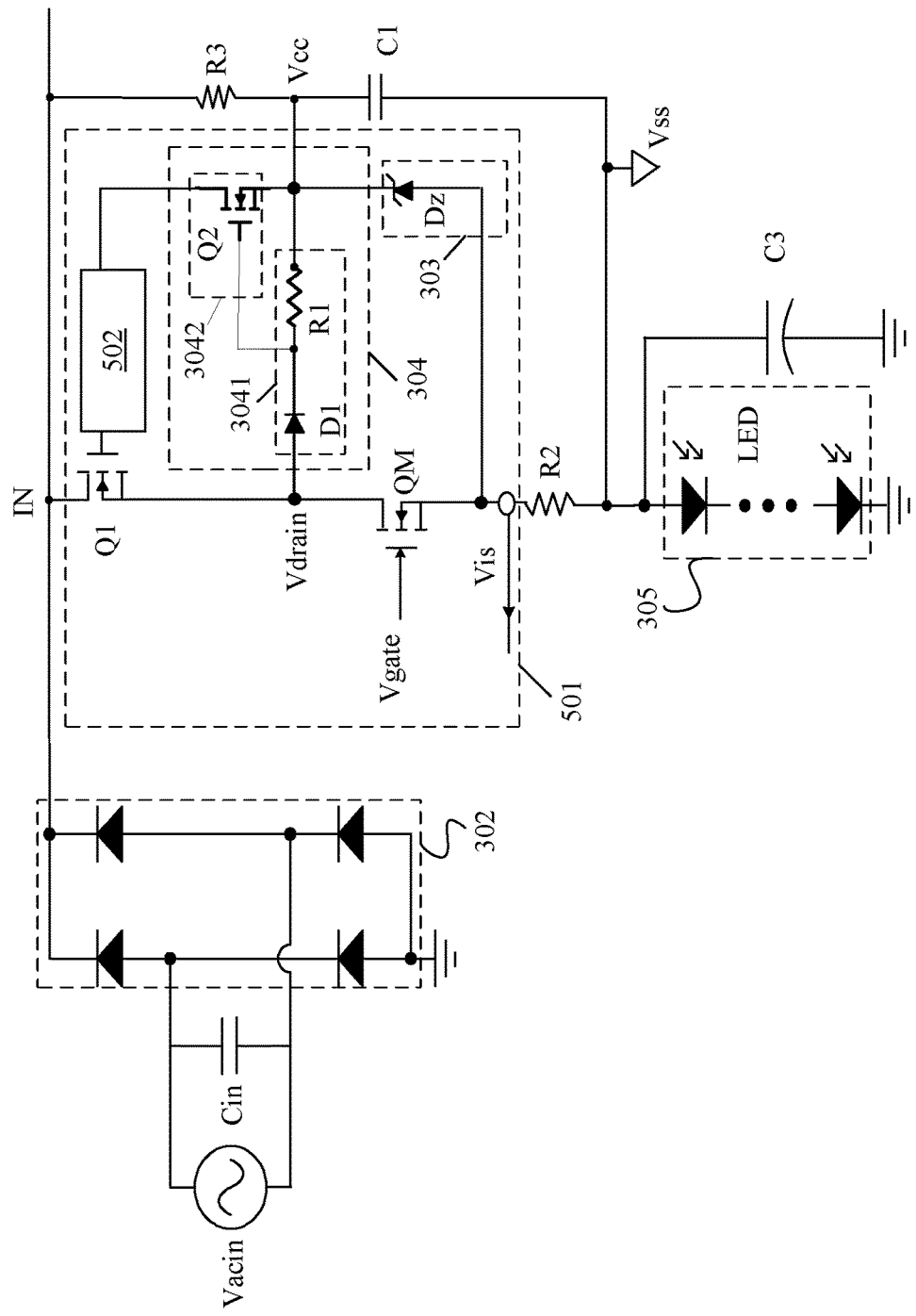
FIG. 5 is a schematic block diagram of a fourth example LED driver, in accordance with embodiments of the present invention.

Referring now to FIG. 5, shown is a schematic block diagram of a fourth example LED driver, in accordance with embodiments of the present invention. In this particular example, over power protection monitor 502 can connect to the gate of auxiliary power switch Q1. Over power protection monitor 502 may also have parasitic capacitor Cgd connected to the gate of auxiliary power switch Q1, and the gate voltage may change along with the energy input to auxiliary power switch Q1. Thus, the gate voltage of auxiliary power switch Q1 can be used to determine if DC bus voltage Vin of auxiliary power switch Q1 is over voltage. If yes, over power protection monitor 502 can turn off main power switch QM and/or auxiliary power switch Q1, in order to protect the LED driver and load 305. In addition, a resistor (not shown) can connect between the gate of auxiliary power switch Q1 and the drain of switch Q2. When DC bus voltage Vin suddenly increases, the voltage on the resistor may also suddenly increase, and the over power protection can protect the LED driver and load 305.

Figure 6:
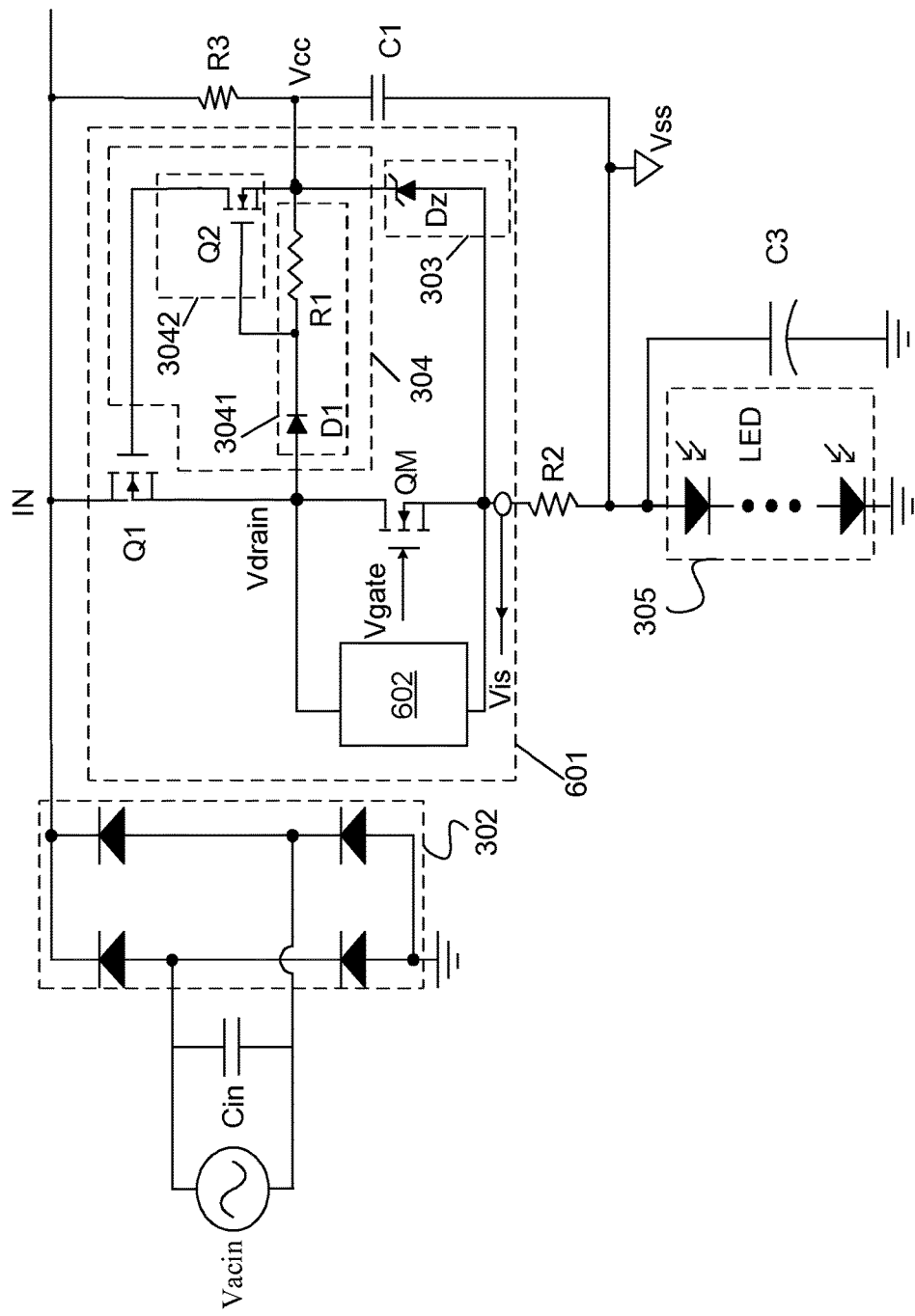
FIG. 6 is a schematic block diagram of a fifth LED driver, in accordance with embodiments of the present invention.

Referring now to FIG. 6, shown is a schematic block diagram of a fifth LED driver, in accordance with embodiments of the present invention. In this particular example, over power protection monitor 602 can connect between the drain and the source of main power switch QM. Over power protection monitor 602 can detect a slope change of drain-source voltage Vds of main power switch QM. For example, it can be determined that DC bus voltage Vin is in an over voltage condition when the slope change is greater than a predetermined value, and over power protection may accordingly to protect the LED driver and load 305. In this way, circuit reliability can be improved, the circuit structure can be simplified, and the circuit volume can be reduced for over power protection.

Figure 7:
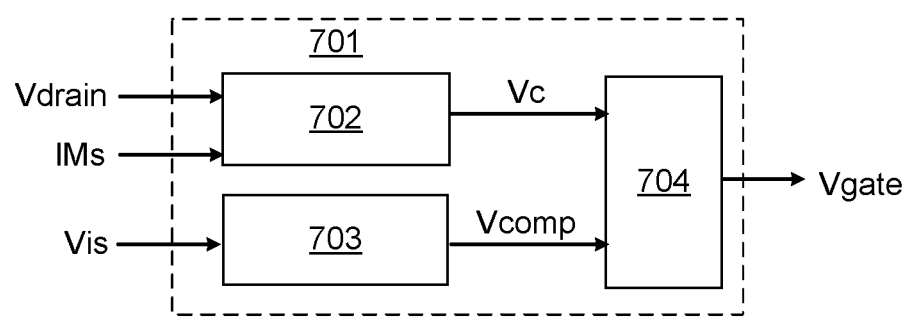
FIG. 7 is a schematic block diagram of a control circuit for an LED driver, in accordance with embodiments of the present invention.

Referring now to FIG. 7, shown is a schematic block diagram of a control circuit for an LED driver, in accordance with embodiments of the present invention. In this particular example, control circuit 701 can include control signal generator 702, feedback compensation circuit 703, and driving circuit 704. Control signal generator 702 can connect to the drain of main power switch QM to receive drain voltage Vdrain and saturation current IMs of main power switch QM, and may generate control signal Vc for controlling main power switch QM. For example, control signal Vc can be activated when drain voltage Vdrain of main power switch QM is less than a predetermined voltage, for turning on main power switch QM. When the current of main power switch QM is saturated, control signal Vc can be inactive, so main power switch QM may be turned off. In this way, the switching states of main power switch QM may be controlled, so as to control driving current Io for the LED load.

For example, drain voltage Vdrain of the main power switch that may represent current DC bus voltage Vin can be sampled as a trigger signal for controlling the switching states of main power switch QM. The trigger signal can be sampled inside the integrated circuit chip. Referring back to FIGS. 3-6 along with FIG. 7, output current sampling resistor R2 can connect between main power switch QM and load 305. Sense voltage signal Vis on the output current sampling resistor R2 that represents driving current Io can be sampled and provided to control circuit 701.

Also, current feedback compensation circuit 703 in control circuit 701 may generate feedback compensation signal Vcomp according to sense voltage signal Vis. Further, driving circuit 704 can generate control signal Vgate for controlling main power switch QM according to control signal Vc and feedback compensation signal Vcomp. In addition, or alternatively, starting resistor R3 can connect between the input terminal of DC bus voltage Vin and capacitor C1. The DC bus voltage Vin may charge capacitor C1 through starting resistor R3 in order to provide the supply voltage during a start-up period of the LED driver.

Figure 8:
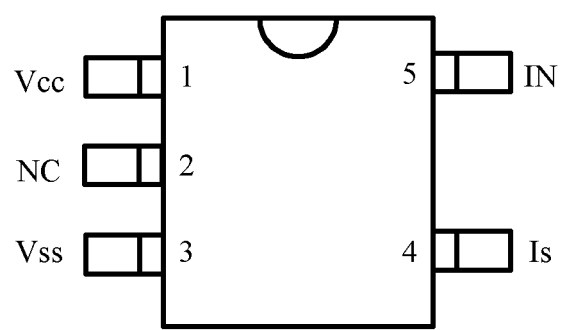
FIG. 8 is a structure diagram of an example integrated circuit chip for an LED driver, in accordance with embodiments of the present invention.

Referring now to FIG. 8, shown is a structure diagram of an example integrated circuit chip for an LED driver, in accordance with embodiments of the present invention. For example, circuits 301, 401, 501, and 601 shown in FIGS. 3-6 can be integrated in the chip shown in FIG. 8. In one particular example, the chip of FIG. 8 can be in the form of an SOT2-3; however, other configurations or types of chips can also be supported in certain embodiments.

Figure 9:
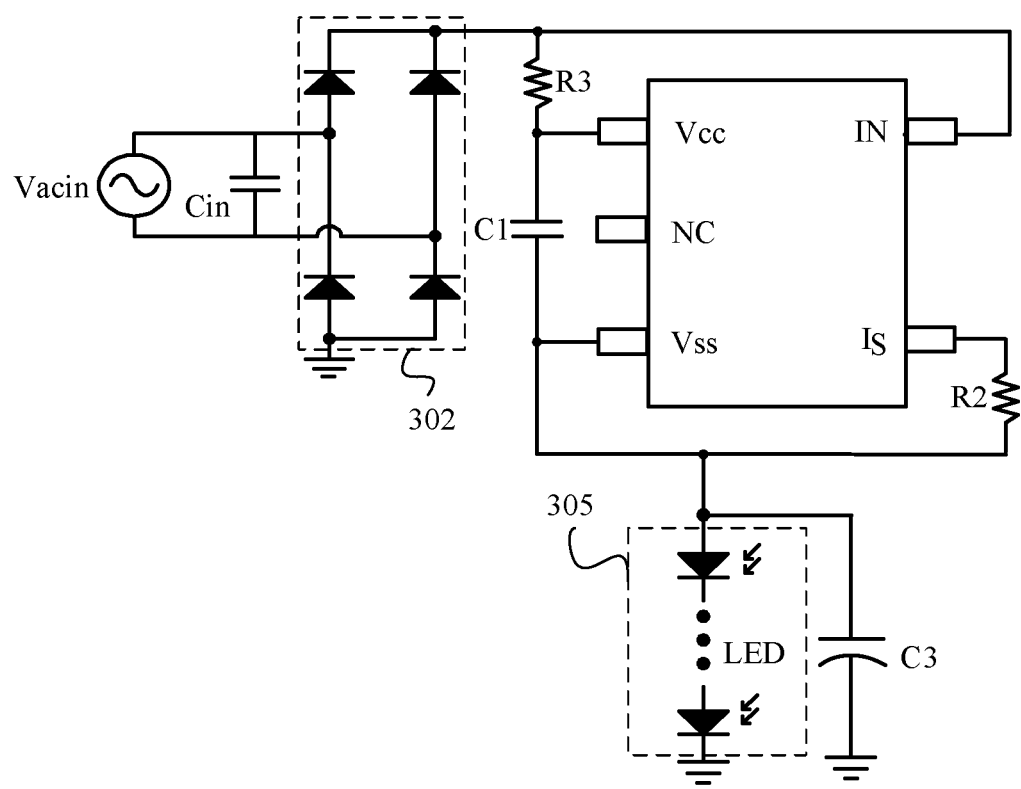
FIG. 9 is a circuit structure diagram employing the integrated circuit chip of FIG. 8, in accordance with embodiments of the present invention.

Referring now to FIG. 9, shown is a circuit structure diagram employing the integrated circuit chip of FIG. 8, in accordance with embodiments of the present invention. The example chip of FIG. 8 can be coupled to peripheral circuits in the example FIG. 9. In this way, an LED driver of particular embodiments may have a simplified circuit structure, as well as reduced circuit volume and product costs, as compared to conventional approaches.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of driving a light-emitting diode (LED) load, the method comprising:
    a) controlling a main power switch by a control circuit of an LED driver, wherein said main power switch, an auxiliary power switch and said LED load are coupled in series between two terminals of a DC bus voltage, and wherein said main power switch is directly connected to said LED load through only an output current sampling resistor;
    b) generating a driving current through said main power switch to drive said LED load when said main power switch and said auxiliary power switch are both on;
    c) controlling said main power switch to turn off in response to said driving current becoming saturated; and
    d) charging a capacitor through said auxiliary power switch when said main power switch is off and said auxiliary power switch is on.

2. The method of claim 1, wherein said capacitor is coupled between a supply voltage of said control circuit and a control ground, and wherein said charging said capacitor comprises limiting a charging current to guarantee that said charging current is less than an upper limit of a predetermined charging current.

3. The method of claim 2, wherein said charging said capacitor further comprises cutting off said charging current when said charging current is greater than said upper limit of said predetermined charging current.

4. The method of claim 3, wherein said cutting off said charging current comprises at least one of turning off said auxiliary power switch, and disconnecting said auxiliary power switch from said capacitor.

5. The method of claim 1, further comprising turning off said auxiliary power switch when said DC bus voltage is greater than an upper limit of a predetermined input voltage.

6. The method of claim 1, further comprising determining, by an over power protection monitor using a parasitic capacitance coupled to a gate of said auxiliary power switch, if said DC bus voltage is greater than an upper input voltage limit, wherein said auxiliary power switch is turned off when said DC bus voltage is greater than said upper input voltage limit.

7. The method of claim 1, further comprising turning on said main power switch in response to a detection voltage at a common node between said main power switch and said auxiliary power switch being less than a first predetermined voltage.

8. A light-emitting diode (LED) driver, comprising:
    a) a main power switch, an auxiliary power switch, and an LED load coupled in series between two terminals of a DC bus voltage, wherein said main power switch is directly connected to said LED load through only an output current sampling resistor;
    b) a control circuit configured to control said main power switch to generate a driving current through said main power switch to drive said LED load when said main power switch and said auxiliary power switch are both on; and
    c) said control circuit being configured to control said main power switch to turn off in response to said driving current becoming saturated; and
    d) a capacitor configured to be charged through said auxiliary power switch when said main power switch is off and said auxiliary power switch is on.

9. The LED driver of claim 8, further comprising:
    a) said capacitor coupled between a supply voltage of said control circuit and a control ground, wherein a voltage across said capacitor is configured as said supply voltage;
    b) a voltage-stabilizing circuit coupled to said supply voltage, and being configured to clamp said supply voltage to a predetermined voltage when said supply voltage reaches a level of said predetermined voltage; and
    c) a supply voltage control circuit coupled between said auxiliary power switch and said supply voltage, wherein said DC bus voltage is configured to charge said capacitor through said auxiliary power switch and said supply voltage control circuit when said main power switch is off.

10. The LED driver of claim 9, wherein said supply voltage control circuit comprises:
    a) a first unidirectional conduction circuit having a first terminal coupled to a first terminal of said main power switch, a second terminal coupled to an input terminal of said supply voltage, wherein said first unidirectional conduction circuit is turned on when a voltage at said first terminal of said first unidirectional conduction circuit is higher than a voltage at said second terminal; and
    b) a second unidirectional conduction circuit having a first terminal coupled to said input terminal of said supply voltage, a second terminal coupled to a gate of said auxiliary power switch, wherein said second unidirectional conduction circuit is turned on when a voltage at said first terminal of said second unidirectional conduction circuit is higher than a voltage at said second terminal.

11. The LED driver of claim 10, wherein said first unidirectional conduction circuit is coupled in series with a current limiter that is configured to limit a charging current of said capacitor in order to guarantee that said charging current is less than an upper limit of a predetermined charging current.

12. The LED driver of claim 11, wherein said first unidirectional conduction circuit is coupled in series with said current limiter, and wherein said current limiter is configured to turn off said auxiliary power switch when said charging current is greater than said upper limit.

13. The LED driver of claim 10, wherein:
a) said first unidirectional conduction circuit is coupled in series with a resistor;
b) said second unidirectional conduction circuit comprises a switch having a drain coupled to said gate of said auxiliary power switch, and a gate and a source coupled to two terminals of said resistor; and
c) said switch is configured to be turned on, and said auxiliary power switch is configured to be turned off, when a voltage across said resistor is higher than a predetermined voltage.

14. The LED driver of claim 8, further comprising an over power protection monitor configured to determine if said DC bus voltage is greater than an upper limit of said input voltage, wherein said main power switch is turned off when said DC bus voltage is greater than said upper input voltage limit.

15. The LED driver of claim 14, wherein said over power protection monitor is coupled to said gate of said auxiliary power switch, and wherein said main power switch is turned off when said gate voltage of said auxiliary power switch is greater than a predetermined voltage.

16. The LED driver of claim 8, wherein said control circuit is configured to turn on said main power switch in response to a detection voltage at a common node between said main power switch and said auxiliary power switch being less than a first predetermined voltage.

17. The LED driver of claim 8, wherein said control circuit is configured to turn off said main power switch in accordance with an output current sampling signal that represents a current flowing through said LED load.

18. The LED driver of claim 8, further comprising an over power protection monitor configured to determine, using a parasitic capacitance coupled to a gate of said auxiliary power switch, if said DC bus voltage is greater than an upper input voltage limit, wherein said auxiliary power switch is turned off when said DC bus voltage is greater than said upper limit of said upper input voltage limit.

19. The LED driver of claim 18, further comprising first and second unidirectional conduction circuits, wherein said first and second unidirectional conduction circuits and said over power protection monitor are coupled between said gate of said auxiliary power switch and a common node between said main power switch and said auxiliary power switch.

20. The LED driver of claim 19, wherein said first unidirectional conduction circuit comprises a resistor coupled to a diode, and said second unidirectional conduction circuit comprises a transistor.

* * * * *